UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BRAN FOOD.

1,189,124.     Specification of Letters Patent.     Patented June 27, 1916.

No Drawing.     Application filed September 18, 1915. Serial No. 51,325.

*To all whom it may concern:*

Be it known that I, JOHN L. KELLOGG, a citizen of the United States, residing at Battle Creek, in the county of Calhoun and State of Michigan, have invented a new and useful Improvement in the Manufacture of Bran Food, of which the following is a specification.

My invention relates to the manufacture of a laxative cereal food from bran, and has for its principal object to provide a bran food of this nature which is more palatable and digestible than the bran foods commonly sold, and which can be eaten alone or in combination with any other cereal food, or with sugar and cream or other food elements like other cereal foods.

My invention consists of a novel process for preparing the bran food and of the new product so prepared, and in order that my invention may be fully understood, I shall first set forth in detail the mode in which I at present prefer to perform the process and the nature of the product so prepared, and then particularly point out in the claims the novel features of the process and product.

In the present performance of my improved process, I take the desired quantity of commercial bran, preferably wheat bran, thoroughly moisten the same and place it by preference in shallow pans. The pans I at present use are approximately 24 inches long by 12 inches wide and 6 inches deep. I then place the pans, by preference, in an ordinary steam retort and cook the bran at about 250° F. temperature for about fifteen minutes. After the bran is thus cooked, it is dried in the ordinary hot air drier, which leaves the cooked bran in a more or less lumpy condition. These lumps are then preferably sifted through a one-quarter inch wire mesh. The cooked bran is then in small lumps about the size of a kernel of rice. The product thus formed is then preferably dampened by sprinkling water over it, and allowed to stand for about ten hours, until the bran is of even texture and of a rubbery consistency. The product is then flaked in an ordinary flaking mill, rolled out and toasted by the method commonly used in the manufacture of other toasted and flaked cereal foods. This cooking and flaking process makes this laxative bran food much more digestible and palatable than the bran commonly sold in the crude form, and it can be eaten and enjoyed like, or in combination with other cereals, with sugar and cream.

It is evident that the process above described can be greatly varied in its performance without departing from the scope and spirit of my invention and without essentially changing the nature and advantages of the product.

I claim as my invention:

1. A process of preparing a bran food in the performance of which the bran is moistened, the moistened bran cooked, the cooked product flaked and the flakes toasted.

2. A process of preparing a bran food in the performance of which the bran is moistened, the moistened bran cooked and dried, the dried product flaked and the flakes toasted.

3. A process of preparing a bran food in the performance of which the bran is moistened, the moistened bran cooked, dried and sifted into small lumps, the lumps dampened, and then allowed to stand until of a rubbery consistency, then flaked and the flakes toasted.

4. A bran food consisting of bran which has been moistened, then cooked, flaked and toasted.

JOHN LEONARD KELLOGG.

In presence of—
   CHAS. M. MARBLE,
   F. A. CLARKE.